INVENTORS
VIRGIL F. BOZEMAN, CLAUDE W. WALZ
ROBERT D. GRIFF, HOWARD F. CLAUSEN
BY
ATTORNEYS

Jan. 12, 1954   V. F. BOZEMAN, SR., ET AL   2,665,533
BEET HARVESTER
Original Filed Oct. 7, 1944   3 Sheets-Sheet 2
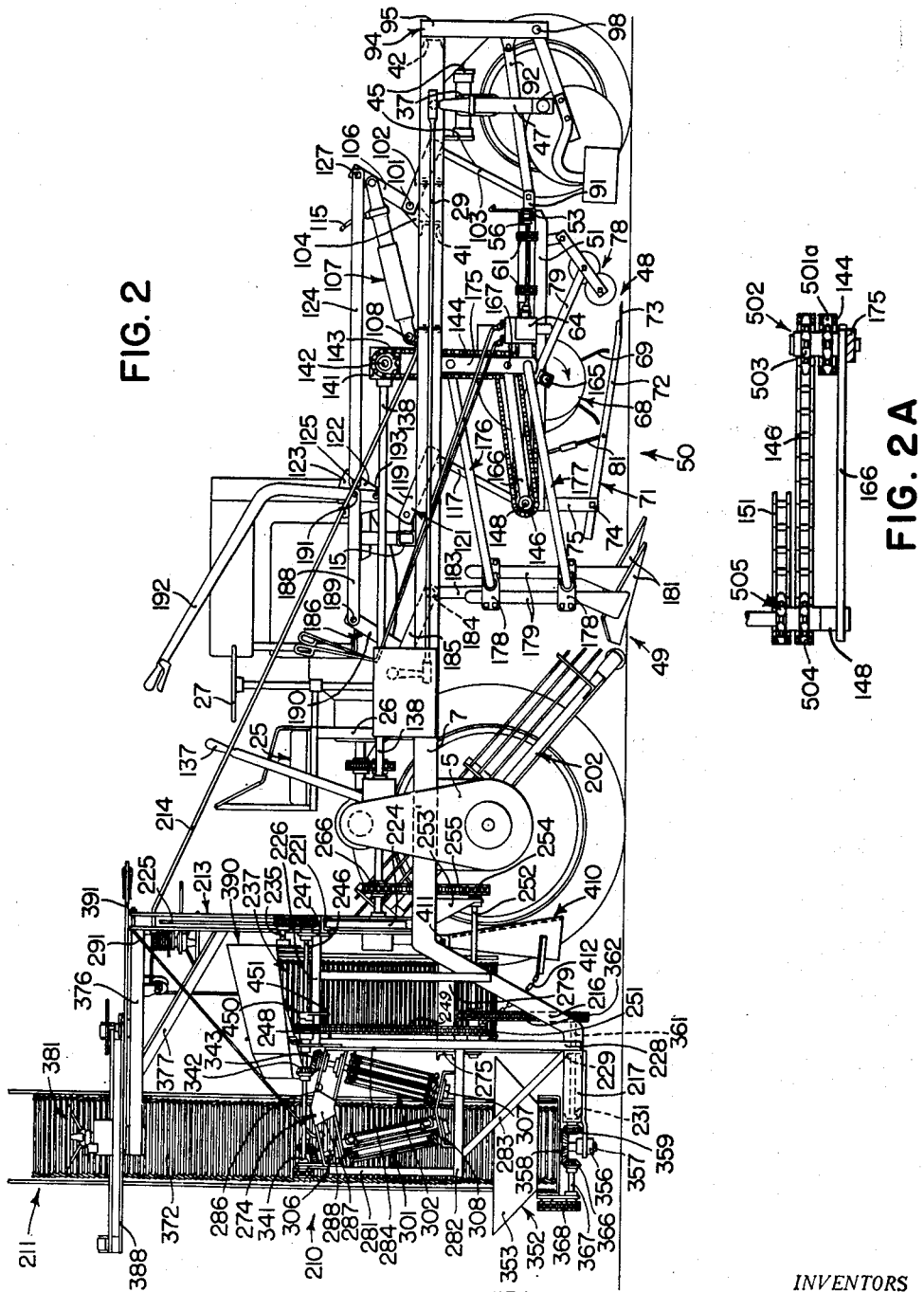
INVENTORS
VIRGIL F. BOZEMAN, CLAUDE W. WALZ
ROBERT D. GRIFF, HOWARD F. CLAUSEN
BY
ATTORNEYS Jan. 12, 1954 V. F. BOZEMAN, SR., ET AL 2,665,533
BEET HARVESTER
Original Filed Oct. 7, 1944 3 Sheets-Sheet 3
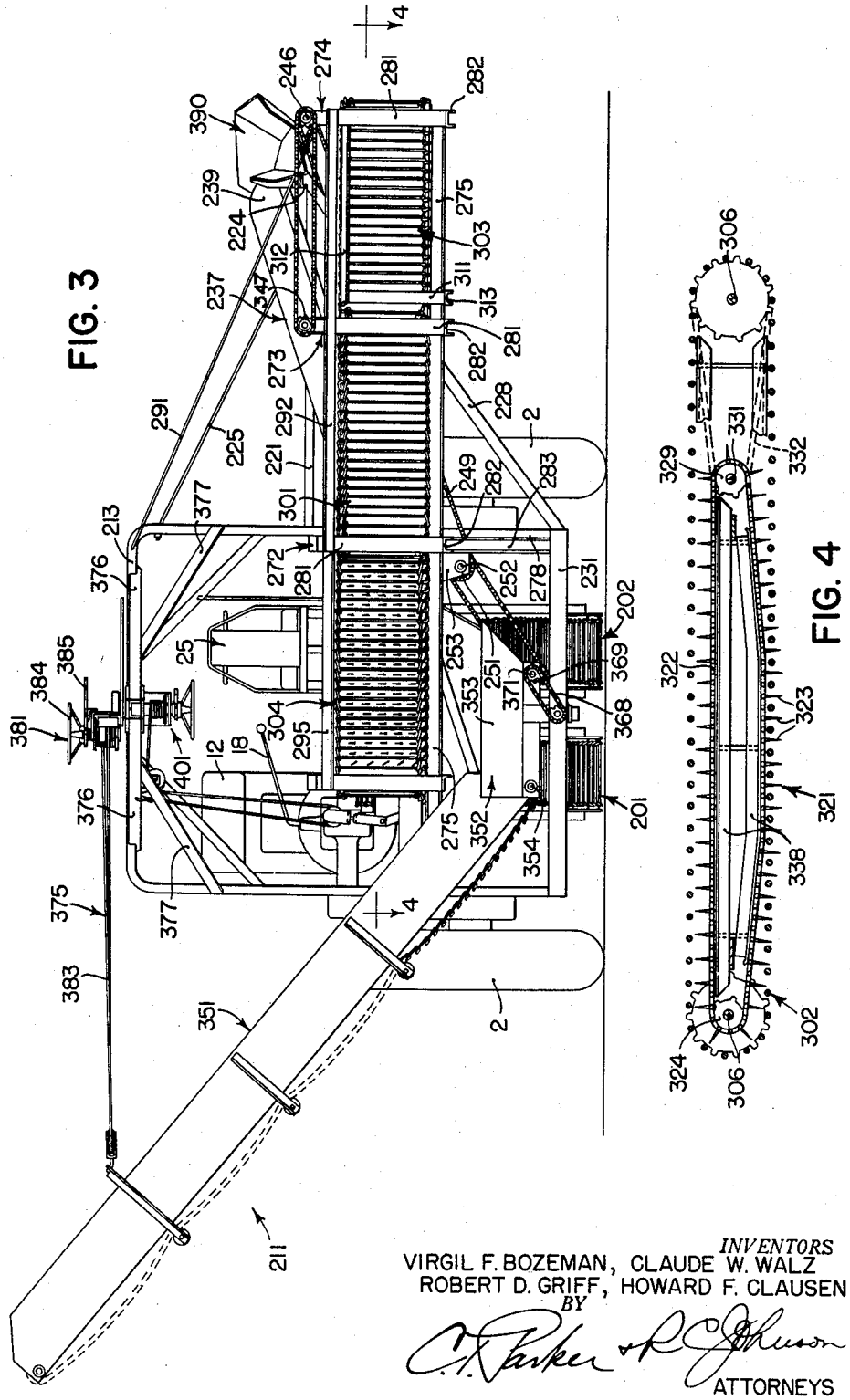
INVENTORS
VIRGIL F. BOZEMAN, CLAUDE W. WALZ
ROBERT D. GRIFF, HOWARD F. CLAUSEN
BY
ATTORNEYS Patented Jan. 12, 1954

2,665,533

UNITED STATES PATENT OFFICE 2,665,533

BEET HARVESTER

Virgil F. Bozeman, Sr., Moline, Claude W. Walz and Robert D. Griff, Rock Island, and Howard F. Clausen, Moline, Ill., assignors to Deere & Company, Moline, Ill., a corporation of Illinois Original application October 7, 1944, Serial No. 557,696. Divided and this application January 5, 1949, Serial No. 69,338

3 Claims. (Cl. 55—106)

This application is a division of our co-pending application, Serial No. 557,696, filed October 7, 1944, now U. S. Patent 2,470,211, issued May 17, 1949.

The present invention relates generally to agricultural machines, particularly to harvesters or combines especially adapted to handle and clean root crops.

The object and general nature of the present invention is the provision of a new and useful harvester for sugar beets and similar root crops, especially designed to top and lift the beets from the ground, clean them of adhering soil, automatically eliminate from the machine any clods or the like that would otherwise tend to pass through the machine with the beets, and lastly, to elevate the beets into a truck, wagon, or other means for direct delivery to the sugar beet mill. More particularly, it is an important feature of the present invention to provide a self-propelled machine or this type, which eliminates separate lifting and hand topping operations for opening up the land.

These and other objects and advantages of the present invention will be apparent to those skilled in the art after a consideration of the following detailed description of the preferred construction, illustrated in the accompanying drawings.

In the drawings:

Figure 2 is a side view of the machine shown in Figure 1.

Figure 2a is a detail view of a part of the drive for the top pick-up drum and top conveyor.

Figure 3 is a rear view of the machine shown in Figures 1 and 2.

Figure 4 is a partial sectional view taken along the line 4—4 of Figure 3 and showing the forward chain of the clod separator unit and the beet spiking chain.

Figure 1:
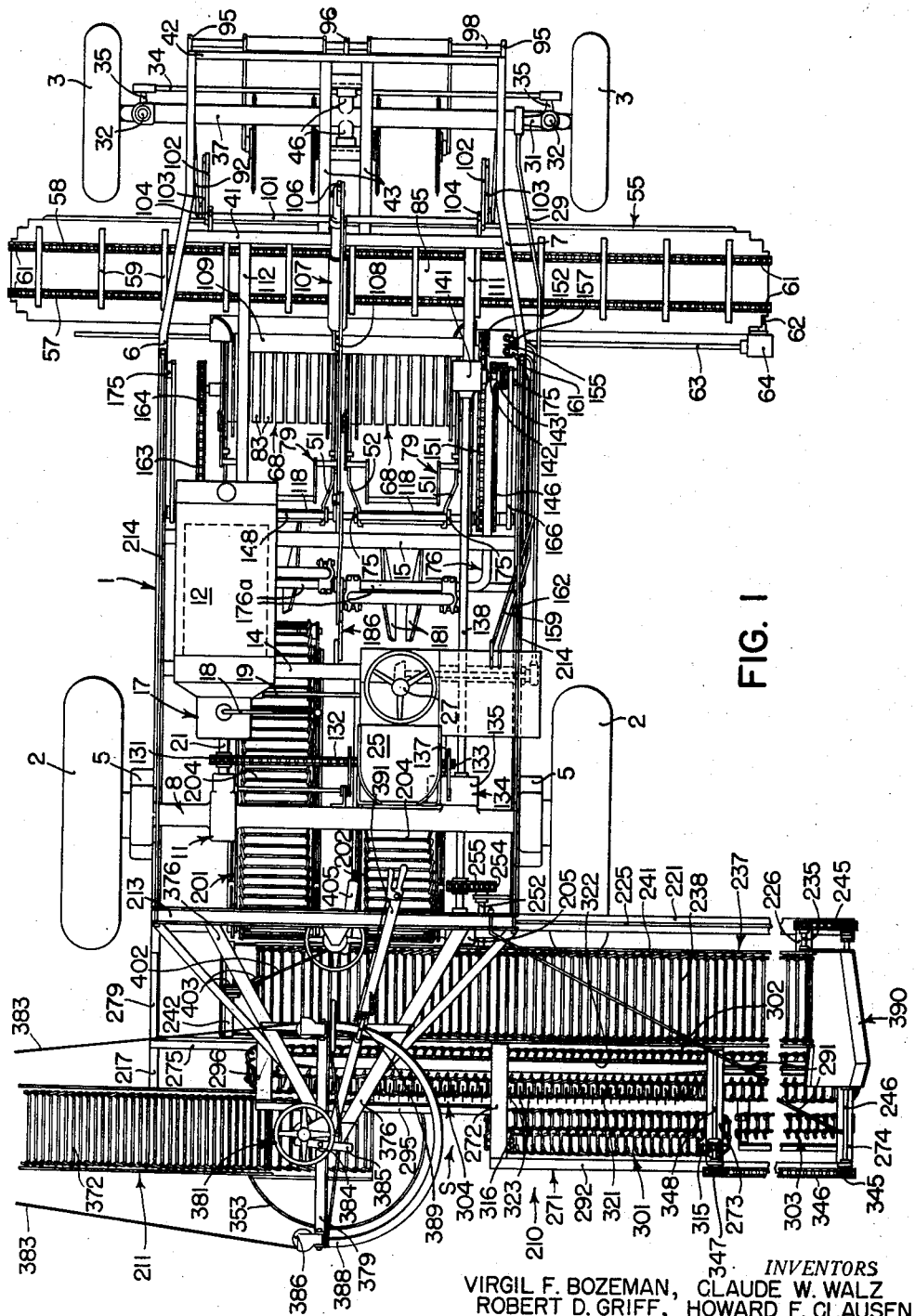
Figure 1 is a plan view of a self-propelled beet harvester or combine in which the principles of the present invention have been incorporated.

Referring first to Figure 1, the beet harvester of the present invention comprises a main frame 1 supported for movement on a pair of rear drive wheels 2 and a pair of front steering wheels 3. The drive wheels 2 are supported at the lower portions of a pair of drive housings 5 upon which side bars 6 and 7, forming a part of the frame 1, are supported. A drive axle 8 connects the upper ends of the drive housings 5 and includes a differential unit 11 through which power from a motor 12 supported on the frame 1, as by being mounted on a pair of cross bars 14 and 15, is delivered to the drive wheels 2. Between the differential 11 and the motor 12 is a gear change case and clutch unit 17, controlled by a gear shift lever 18 and a clutch shaft 19. A propeller shaft 21 connects the transmission unit 17 with the pinion (not shown) of the differential unit 11. It is to be noted that the motor 12 and associated parts are mounted well toward the left side of the machine, and the reason for this particular arrangement will appear later.

An operator's station 25 is carried by the main frame 1, as through suitable supports 26, and by means of a steering wheel 27, mounted adjacent the operator's station 25 and connected through steering mechanism 29 with the front steering wheels 3, the machine may be guided. The front end of the steering link 29 is connected through an arm 31 with one of the spindles 32 which carry the front steering wheels 3. A drag link 34 connects the two steering arms 35 of the front steeling wheels 3. The front end of the machine is supported on a front axle 37 for movement relative thereto about a longitudinal axis. To this end, connected between a cross bar 41 of the frame 1 and a front cross bar 42, is a pair of longitudinal frame bars 43 through which a pair of fore and aft spaced depending brackets 45 are fixed (Figures 1 and 2). These brackets 45 receive trunnions 46 that are carried by the central portion of the front axle 37 and are rockable in the brackets. Thus, passage of the machine over irregular terrain does not impose unnecessary strains or cause objectionable distortion of the frame 1. Preferably, sleeves 47 are fixed to the ends of the front axle 37 to receive the front wheel spindles 32.

Carried by the front portion of the main frame 1 is topping and lifting mechanism indicated in its entirety by the reference numeral 50, consisting essentially of a topping unit 48 and a beet lifting or pulling unit 49. The topping unit 48 is quite similar to the topping mechanism shown in U. S. Patent 2,433,799, issued December 30, 1947 to Claude W. Walz, Clarence T. Rasmussen and Howard F. Clausen, to which reference may be made if necessary. Briefly, the topping unit 48 includes two sets of fore and aft extending topping unit frame bars 51 and 52 connected together at their front ends by a transverse angle bar or frame member 53 and other transverse members (not shown) as needed and forming, in effect, a sub-frame movably suspended under the main frame 1. By suitable rollers (not shown) a laterally shiftable top conveyor unit 55 is supported on the topping frame or sub-frame 51—53 for transverse shifting movement relative thereto. The laterally shiftable top conveyor includes a laterally shiftable support 56 and a pair of endless chains 57 and 58 carrying flights 59 and operating over sprockets 61 at each end of the top conveyor unit 55. One set of sprockets is fixed to a drive shaft 62 which receives power from an actuating shaft 63 through a gear box 64. Also mounted on the topping frame 51—53 is a pair of pick-up drums 68, each having top engaging fingers 69. The topping frame 51—53 also carries a pair of pivoted topping knives 71, each consisting of a generally U-shaped frame 72 carrying a forwardly curved topping knife 73 at its front end and pivoted, as at 74, at its rear end to depending brackets 75 forming a part of the topping frame. Pivoted to the front end of the topping frame is a finder unit 78 which through a pair lever arms 79 and linkage 81, acts to control the position of the associated topping knife 73. There are two topping knives 73 and two finder units 78. The two pick-up drums 68 are mounted, relative to the associated knives 73, so that the fingers 69 move rearwardly and upwardly away from the knife and are disposed on both sides of the associated knife arms 72. The fingers 69 sweep away the tops cut by the knives 73 and carry them upwardly and rearwardly, and then forwardly and over the drums from which they are removed by stripper plates 83 (Figure 1) and forced onto the platform 85 of the transverse conveyor 55.

The topping unit 48 is supported for movement generally in a vertical direction relative to the main frame 1 by means that may be adjusted from the operator's station 25 on the machine. As best shown in Figures 1 and 2, a pair of brackets 91 is fixed to the front side of the angle 53 and forms means whereby generally horizontally extending pull links 92 may be connected between the topping frame and a front draft frame 94 carried by the main frame 1. The front draft frame preferably consists of a pair of depending brackets 95 and a center depending bracket 96, the brackets receiving a transverse draft bar 98. A rockshaft 101 is mounted for rocking movement on the main frame and includes a pair of forwardly extending arms 102 which are connected by downwardly extending links 103 with the front end of the topping frame 51—53, preferably through the brackets 91. Preferably, the rockshaft 101 is supported for rocking movement in brackets 104 fixed to the frame angle 41. Centrally of the rockshaft 101, an arm 106 is fixed to the shaft 101 and receives one end of a lift cylinder unit 107, the other end of which is anchored, as at 108, to a bracket fixed to an intermediate frame bar 109 that extends transversely of the machine and is fixed at its ends to intermediate longitudinal frame bars 111 and 112. The forward ends of the longitudinal frame bars 111 and 112 are fixed to the cross frame bar 41 and at their rear ends to the cross frame bar 15. When fluid under pressure, as will be described below, is directed into the cylinder unit 107, as through a hose 115, the arm 106 is swung rearwardly, which raises the lifting arms 102 and thus raises the front end of the topping unit. The rear end of the topping unit is lifted by means similar to that just described, namely, by a link 117 connected at its lower end with the rear angle 118 of the topping unit frame 51—53. The upper end of the link 117 is connected to an arm 119 that forms a part of a bell crank 121, the other arm 122 of which is formed as a sector 123 and is connected through a link 124 with the forward central arm 106 that is operated by the cylinder 107. The arm 122 is connected by a pivot 125 with the rear end of the link 124 and the front end of the link 124 is connected by a pivot 127 with the upper end of the arm 106, as best shown in Figure 2.

The drive for the top conveyor 55 and the pick-up drums 68 will now be described. A sprocket 131 (Figure 1) is fixed to the propeller shaft 21 rearwardly of the transmission unit 17 and receives a driving chain 132 which at its other end is connected to a sprocket 133 which forms the driving part of a clutch unit 134. The latter includes a casing 135 enclosing a clutch mechanism (not shown) controlled by a lever 137, and a longitudinally extending shaft 138 extends through the casing 135. The front end of the shaft 138 enters a casing 141 and carries one gear of a set of bevel gears by which a transverse shaft 142 is driven. The shaft 142 extends laterally outwardly of the casing 141 and carries a sprocket 143 over which a chain 144 is trained. The lower end of the chain 144 passes over one gear 501a (Figure 2a) of a double sprocket gear 502, the other gear 503 of which receives one end of a chain 146, the rear end of which passes over one sprocket 504 of a double sprocket member 505 fixed to a transverse shaft 148 mounted in suitable bearings on the rear end of the topping frame 51—53, 118. Another chain 151 extends forwardly from the last mentioned double sprocket 505 and is trained around a sprocket 152 which forms a part of a reversing mechanism 155. The latter is arranged to drive the actuating shaft 63 either in one direction or the other and is controlled by a short lever 157 extending from the unit 155 and controlled by a rod 159 that extends to a point adjacent the operator's station 25. According to the setting of the lever 157, the shaft 63 may be rotated in one direction or the other, and thus utilized for driving the top conveyor 59 in a direction to discharge the tops either at one side or the other side of the machine, as desired. Mechanism is also provided in the reversing unit 155 for controlling whether or not the shaft 63 will be actuated as a shaft to drive the top conveyor chains 57 and 58 or to shift the top conveying unit 55 bodily in one direction or the other of the tractor. Generally, the mechanism to this end is of the same construction as shown in the above-mentioned co-pending application and is controlled by a second lever 161 to which a rod 162 is connected and leads to a point adjacent the operator's station 25. The left end of the shaft 148 on the topping frame carries a sprocket (not shown) over which a chain 163 is trained, the front end of the chain 163 serving to drive a sprocket 164 fixed to a shaft 165 to which the two pick-up drums 68 are fixed in any suitable manner. The rear end of the topping unit frame 51, 52 is connected by a pair of links 166 which at their rear ends are pivoted to the shaft 148 and at their forward ends are pivoted on studs 167 carried by depending arms 175 fixed to the main frame bars 6 and 7. The links 166 are arranged to be parallel to the links 92. The double sprocket about which the lower end of the chain 144 and the forward end of the chain 146 are trained, is mounted on the stud 167 carried by the right hand arm 175. Thus, the topping unit frame always moves into parallel positions, since the links 103 and 117 and the arms 102 and 119 are also parallel and of the same lengths, as shown in Figure 2.

At each side of the main frame the depending arm 175, fixed at its upper end to the associated frame bar, is apertured to receive the front ends of a pair of bails 176 and 177. The rear or central portions 176a of the bails 176 and 177 are formed to receive pivot clamps 178 by which the shanks 179 of lifting plows 181 are pivotally connected with the upper and lower bails 176 and 177. The tools at the right side of the machine, as shown in Figure 1, are mounted with their pivot clamps extending rearwardly from the adjacent portions of the bails 176 and 177 while the pivot clamps of the left tools 181 are mounted forwardly of the transverse portions of the associated bails, thereby providing for one set of tools being disposed offset laterally and forwardly with respect to the other lifting tools. The bails 176 and 177 are connected so that the lifting plows 181 remain in the same angular position with respect to the ground, moving into different parallel positions. A link 183 is connected at its lower end to the central portion 176a of the upper bail 176 and at its upper end is pivotally connected, as at 184, to one arm 185 of a bell crank 186 that is rockably mounted on the main frame of the machine. A link 188 is connected, as at 189, to the arm 190 of the bell crank 186 and extends forwardly and is pivotally connected, as at 191, to an adjusting hand lever 192 pivoted, as at 193, on the sector 123. Thus, the tools 181 may be raised and lowered with the topping unit whenever the cylinder 107 is actuated. However, by unlatching the hand lever 192, the position of the lifting tools 181 may be adjusted relative to the topping unit.

A pair of beet conveyors 201 and 202 are mounted on the rear end of the main frame and extend downwardly and forwardly therefrom to points adjacent the rear ends of the beet lifting plows 181. These elevators or conveyors, one of which is somewhat longer than the other to accommodate the above-mentioned offset relation of the lifters, are adapted to be raised and lowered with the lifting plows by means of suitable connections (not shown) between the front ends of the conveyors and the lifting arm 185. Each of the above-mentioned beet conveyors 201 and 202 includes a conveyor chain 204 trained over rear sprockets that are mounted on a transverse shaft, the right end of which extends into a bevel gear case 205. The latter also receives the rear end of the drive shaft 138, and through bevel gears (not shown) mounted within the case 205, the shaft carrying the conveyor sprockets is driven from the shaft 138.

At the rear end a cleaning unit 210 and a laterally swingable loading elevator or beet discharge elevator 211 are provided. An upwardly extending frame arch 213 is fixed at its lower end to the rear portions of the main side frame members 6 and 7 and is braced by forwardly extending rods 214. As best shown in Figure 2, the rear portions of the main frame side members 6 and 7 are bent downwardly, as at 216 and then extend rearwardly, as at 217. A laterally outwardly extending bar 221 is fixed at its inner end to the right portion of the vertical arch 213 and extends laterally outwardly therefrom. The frame member 221 is supported by a tension rod 225. The frame member 221 is also braced by a strut 224 which extends upwardly and diagonally from the lower rear portion of the frame. A cross bar 226 extends rearwardly from the main bar 221 and at its rear end is fixed to a second diagonal bracing member 228. At its lower end the diagonal brace member 228 is fixed to the lower rear portion 217 of the right frame bar 7. Adjacent this point a rear cross member 229 extends transversely to the other side of the frame and thus connects the rear horizontal sections 217 of the main frame members 6 and 7. A second cross bar 231 is connected to the rear ends of the frame bars 6 and 7. As best shown in Figure 2, a shaft 235 is supported above the frame member 226 by suitable brackets or the like and serves to pivotally receive the upper end of a conveyor indicated in its entirety by the reference numeral 237. The conveyor 237 includes an endless chain similar to a potato chain, indicated by the reference numeral 238, trained over sprockets on the shaft 235 at the upper end of the conveyor and at the lower end of the conveyor the chain 238 is trained over suitable idler sprockets. The conveyor unit 237 includes suitable side bars 239 and 241 (Figure 1) connected together at their lower ends by a cross bar 242. This end of the conveyor 237 may be raised and lowered, as will be explained in detail below. Normally, the lower end of the conveyor 237 is disposed well below the discharge ends of the two beet conveyors 201 and 202. A sprocket on the front end of the shaft 235 receives a chain which extends downwardly and laterally outwardly and is trained over a sprocket fixed to the front end of a shaft 245 which is mounted for rotation in brackets 247 fixed to the frame bars 226 and 228. A second sprocket 248 is fixed to the shaft 246 and receives a chain 249 that extends downwardly and laterally inwardly, being trained around a sprocket 251 fixed to a shaft 252 that is carried in a pair of brackets 253 and 253′ suitably fixed to the main frame. A sprocket 254 on the front end of the shaft 252 receives a chain 255. A sprocket 266 on the rear end of the shaft 138 provides for delivery of power to the conveyor chain 238 and, through the rear portion of the shaft 246, to the cleaning unit 210 which will now be described.

The cleaning unit 210 includes a framework indicated in its entirety by the reference numeral 271 and a plurality of cross frame structures 272, 273 and 274, all supported from a main transverse bar 275 which at one end is connected to the left main longitudinal frame member 6, as best shown in Figure 1 and which at its other end extends laterally outwardly beyond the right hand main frame member 7. As best shown in Figure 3, the cross bar 275 is connected to the main frame member 7 by a vertical strut 278 and a horizontal member 279.

The cross frame structure 272 includes an outer strut 281, a lower channel 282, the inner end of which is fixed in any suitable way to the main cross member 275. The lower end of the vertical member 278 is connected by a diagonal brace member 283 to the outer end of the strut 282, as best shown in Figure 2. A member 284 extends upwardly from the main frame member 275 and at its upper end is connected to an upper cross member which is made up of two angularly related sections comprising spaced apart portions 286 and 287 connected together by connecting webs 288. Each of the frame structures 272, 273 and 274 is similar to that just described.

Referring to the cross frame structure 273 of the cleaning unit, there is no diagonal member 283, but instead the plate 284 is connected, as by welding or the like, to the diagonal brace 228. The outer cross frame structure 274, which is disposed laterally outwardly of the diagonal brace 228, is reenforced by a rod 291 that at its outer end is connected to the frame portion 286 of the cross frame structure 274, the upper end of the rod 291 being connected to the frame arch 213. A frame member 292 extends from the frame structure 272 laterally outwardly to the frame structure 274. An auxiliary frame member 295 extends from the inner frame structure 272 to another cross frame structure 296 which is carried by the main cross member 275 in a position well toward the left side of the machine, as just shown in Figure 1.

The mechanism of the cleaning unit 210 includes two driven endless chain units 301 and 302 operating in conjunction with a stationary chain section 303 and a spiking section 304. The endless chains 301 and 302 may be similar to or substantially the same as the elevator and conveyor chains described above, commonly known as potato chain. As best shown in Figure 2, the cleaning chain 302 is supported in a generally vertical position, being slightly inclined forwardly along its upper edge. The chain 302 is supported in that position by upper and lower sprockets around which the chain is trained, the sprockets being fixed to shafts 306 journaled in bearings 307 carried by the right-hand cross frame structure 274 and the associated lower channel 282. Preferably, the lower bearing is supported by the channel 282 through a bracket 308. The support for the other end of the chain 302 is of similar construction, the upper bearing for the left-hand shaft 306 being carried by the cross frame structure 272 and the lower bearing being supported by the associated channel 282.

The stationary length of potato chain 303 is disposed in a generally vertical plane, inclined rearwardly, however, to about the same extent that the plane of the chain 302 is inclined forwardly. The stationary chain 303 is fastened at its outer end to the right-hand cross frame structure 274 and at its inner end to a bar 311. The latter is connected at its upper end through an angle 312 that extends laterally outwardly to the cross frame structure 274, and at its lower end the bar 311 is connected to a channel 313 which is carried by the main cross frame member 275. Immediately inwardly of the stationary chain 303 is the endless chain 301. This chain is supported by sprockets 315 and 316 supported on shafts carried by the cross frame structures 272 and 273. The plane of the chain 301 is disposed generally vertically, being inclined rearwardly like the plane of the chain 303.

Operating within the front chain 302 is a spiking chain 321. This chain includes an endless element 322 carrying spikes 323 and trained over idler sprockets 324 mounted on the left hand shaft 306. Suitable guiding structure is provided for the spiking chain, and the latter is trained over driving sprockets 329 supported on an auxiliary shaft 331 and driven by a chain 332 from a sprocket on the outer shaft 306. The supporting and guiding structure for the spiking chain includes a pair of bars 338 which are shaped, as best shown in Figure 4, to cause the spikes to be projected outwardly between the links of the chain 302 and to move with the latter through what might be termed a spiking zone, as best shown in Figure 4. The bars 338 are then, considering the direction of travel of the chains 302 and 321, parallel with respect to the chain 302 and are disposed close to the path of travel of the latter so that the spikes 323 project an appreciable distance outwardly beyond the links of the chain 302. This forms what might be termed a separating zone, inasmuch as the spikes impale beets thereon but if any clods are present the spikes break up the clods by cracking or fracturing them. Beyond the separating zone the bars 338 are shaped to form a stripping zone, during which the spikes 323 are gradually withdrawn to points within the chain 302. This causes the beets to be stripped from the spikes 323.

The mechanism for driving the chains 301, 302 and 321 will now be described. As best shown in Figures 2 and 3, the shaft 246 is extended rearwardly and is supported by suitable bearing means 341 on the outer cross frame structure 274. The shaft 246 carries a bevel gear 342 which meshes with a companion gear 343 carried at the upper end of the laterally outer shaft 306. The gears 342 and 343 thus drive the chain 302. As described above, the chain 332 drives the spiking chain 321 from the outer shaft 306. A sprocket 345 is fixed to the rear end of the shaft 246 and receives a sprocket chain 346 which extends laterally inwardly and is trained over a sprocket 347 fixed to a shaft 348 that is supported on the cross frame structure 273. Through a set of bevel gears similar to the gears 342, 343 described above, the shaft 348 drives the chain 301.

The loading elevator 211 includes a swingable section 351 and a hopper section 352, as best shown in Figure 3. The hopper section 352 comprises a generally circular hopper 353 and bearing means 354 upon which the swingable elevator section 351 is pivotally mounted. The hopper 353 is supported for movement about a generally vertical axis upon suitable bearings 356 carried by the rear frame extensions 217. Coincidental with the axis of swinging movement of the hopper 352 is a drive shaft 357 carrying a bevel gear 358 that meshes with a pinion 359, fixed to the outer end of a shaft 361, the inner end or forward end of which carries a sprocket receiving a drive chain 362 that is trained at its upper end over a sprocket carried by the shaft 252 (Figure 2). The bevel gear 358, which may be loosely mounted on the shaft 357, serves to drive a third bevel gear 366 fixed to a short shaft 367 to the outer end of which a sprocket receiving a chain 368 is fixed. The chain 368 serves to drive a sprocket 369 that is fixed to a shaft 371 which drives the chain 372 of the elevator 351 in the usual manner.

The outer or swinging end of the loading elevator 211 is supported by an adjustable cable mechanism 375 which will now be described. Extending convergingly rearwardly from the frame arch 213 is a pair of bars 376 disposed in a generally horizontal plane and reenforced by a pair of braces 377. The rear ends of the bars 376 are connected together and form a pivotal support for a horizontally swingable arm 379 which carries manually adjustable winch structure 381. Cables 383 are connected to the outer end of the loading elevator 211, as best shown in Figure 3, and to the winch structure 381. The latter includes an adjusting wheel 384 and a manually controlled latch 385 therefor, whereby releasing the latch 385 and turning the wheel 384 in one direction or the other serves to raise or lower the outer end of the loading elevator 211. The cables 383 pass over sheaves 386 carried at the outer end of the swinging arm 379. Formed as a part of the latter is an arcuate sector 388 which passes through latch means 389 carried by a hand-operated lever 391 which is swingable about the axis of bearing of the arm 379 in the supporting structure 376 therefor. The lever 391 extends to a point adjacent the operator's station 25 on the machine and the lever may be moved back and forth, with proper actuation of the latching mechanism 389, to swing the arm 379 and the outer end of the loading elevator 211 into any position desired, from one side of the machine around to the other side. This movement takes place about a vertical axis that coincides with the axis of swinging of the hopper 352 on its supporting framework 217 and associated parts.

As best shown in Figure 1, the chain 301 terminates at or adjacent the end of the separating zone so that there is an open space S at the end of the chain 301 and between the latter and the hopper 353. Downwardly through this space fall any clods that do not fall downwardly through the chains 301 and 302, but the beets are still held on the spikes 323 until they reach a point over the hopper 353. Then they are stripped from the spikes and allowed to fall directly into the hopper 353 from whence they are elevated into a loading container by the operation of the loading chain 372.

The operation of the machine as so far described is substantially as follows. The beets in two rows are topped by the knives 73 and the tops removed by the stripping drums 68 and transferred onto the top conveyor 55. The topped beets from the two rows are then loosened and lifted by the shoes 181 and moved by the conveyors 201 and 202 onto the lower receiving end of the cross conveyor 237. The beets, together with any clods that may pass over with the beets, are then shifted laterally outwardly and upwardly into a hopper 390 from whence the beets and clods are directed into the space between the chain 302 and the stationary chain 303. The chain 302 is driven, by the mechanism described above, and the function of the stationary chain is, cooperating with the moving chain 302, to roll the beets and agitate them to as to remove all adhering soil and break up any large clods that may possibly be present. The beets are thus moved by the moving chain 302 into the separating zone, which is defined by the two chains 301 and 302. These chains are driven at the same peripheral speed and during the progress of the chains the spikes 323 are projected laterally outwardly so as to impale thereon all of the beets in this zone. The clods do not become impaled on the points but are either cracked or entirely disintegrated by the action of the points. Most of the broken clods thus fall downwardly between the links of the chain, but any clods that are still too large to fall between the links of the chains are carried by the movement of the chains over to the space S from which they fall directly to the ground. However, the beets are all impaled on the points 323 and, as mentioned above, remain on the chain 302 until they are stripped therefrom and are deposited in the hopper 353.

Under favorable conditions, clods and objectionable quantities of adhering soil may not be present, in which case it may not be necessary to run the beets through the cleaning unit 210. In order to provide for running the beets directly from the conveyors 201 and 202 into the hopper 353, thus saving the wear and tear on the cleaning unit and likewise realizing a saving in the power required, we have provided an arrangement by which the left end of the conveyor 237 may be raised to a point above the discharge ends of the two conveyors 201 and 202. According to the principles of the present invention, this may be performed quickly and easily by a winch structure 401 which includes cables 402 trained over sheaves or the like, as at 403, and connected at the lower end to the bail 242 at the left end of the elevator 237. A latch 405 serves to hold the upper end of the conveyor 237 in either its upper or its lower position. When the receiving end of the conveyor 237 is raised into a position so that the beets from the conveyors 201 and 202 do not fall into it, a chute 410 (Figure 2), which is pivoted at 411 on the main frame, is automatically brought up into a position to direct the beets directly from the discharge ends of the conveyors 201 and 202 into the hopper 353. The chute 410 is pivoted directly underneath the discharge ends of the conveyors 201 and 202 and has its outer end connected by a chain 412 to the swinging end of the conveyor 237, so that when the latter is raised up into its inoperative position, the chute 410 is automatically swung up into its operative position, the chute 410 being shown on its inoperative position in Figure 2.

The top conveyor 55 and the loading elevator 211 may be disposed at either side of the machine, according to requirements of the particular field being harvested. Generally, it is desired to windrow the tops, that is, deposit into one row the tops from a plurality of rows being harvested, and it is, of course, necessary to run the trucks or wagons that receive the beets from the loading elevator 211 over portions of the field that either had been harvested or are sufficiently clear to accommodate the passage of the vehicles. The swingable mounting of the loading elevator 211 and the shiftable mounting of the top conveyor 55 easily and readily accommodates placing the tops and the trucks or wagons wherever necessary without interfering with the operation of the machine. As best shown in Figure 1, the cleaning unit 210 and the conveyor unit 237 extend laterally outwardly at the right side of the machine, and the motor 12 and associated parts, mounted on the left side of the machine, counterbalance the weight of the laterally outer portions of the units 210 and 237, and also the loading elevator 211, in case the latter is swung over toward the right of the machine. It is a relatively simple matter for the operator to operate the winch 401 to raise and lower the cross conveyor 237 according to whether or not it is desired to run the beets through the cleaning unit 210. Preferably a clutch 450 is mounted on the shaft 246 (Figure 2) and is connected by a link 451 to some part of the vertically swingable conveyor 237, the parts being so arranged that when the left end of the conveyor 237 is raised into its inoperative position, the link 451 serves to automatically disengage the clutch 450 and thus prevent the drive being transmitted to the cleaning chains.

While we have shown and described above the preferred structure in which the principles of the present invention have been incorporated, it is to be understood that our invention is not to be limited to the particular details shown and described above, but that, in fact, widely different means may be employed in the practice of the broader aspect of our invention.

What we claim, therefore, and desire to secure by Letters Patent is:

1. A beet harvester comprising a mobile frame, a topping frame, a plurality of arm means mounted in parallel relation on said mobile frame, depending arm means fixed to said mobile frame, a rear pair of links connecting the rear end of said topping frame with the lower portion of said arm means, forward link means disposed generally parallel with said rear pair of links and connecting the forward end of said topping frame with said mobile frame, a pair of vertically spaced bail members disposed in parallelism and connected swingably with said depending arm means, crop engaging lifting means carried by said bails and raised and lowered with the latter, an arm means swingably mounted on said mobile frame in parallelism with said plurality of arm means and connected with said bail members for raising and lowering said lifting means with said conveyor frame.

2. A beet harvester as defined in claim 1, further characterized by said bails having central sections extending transversely of the harvester, said crop engaging lifting means comprising a pair of lifting tools connected at the rear sides of the central portions of said bails and a second pair of lifting tools at the other sides of the central portions of said bails and disposed forwardly, whereby the tools at one side of said mobile frame are offset in a fore and aft direction with respect to the other tools.

3. In a two row beet harvester, a mobile frame adapted to pass over two plant rows, a pair of generally vertically swingable bails pivotally connected with said frame and each including a central section extending across two plant rows, beet lifting means for one of said rows carried by said bail sections at the rear side and adjacent one side of the mobile frame, and a second beet lifting means carried by said bail sections at the forward sides thereof and adjacent the other side of said mobile frame.

VIRGIL F. BOZEMAN, SR.
CLAUDE W. WALZ.
ROBERT D. GRIFF.
HOWARD F. CLAUSEN.

References Cited in the file of this patent

UNITED STATES PATENTS

| Number | Name | Date |
|---|---|---|
| 993,704 | Minato | May 30, 1911 |
| 1,283,810 | Kuky | Nov. 5, 1918 |
| 1,301,328 | Smith | Apr. 22, 1919 |
| 1,369,721 | Wilson | Feb. 22, 1921 |
| 1,463,078 | Gilmore et al. | July 24, 1923 |
| 1,666,636 | Wood et al. | Apr. 17, 1928 |
| 1,748,746 | Zuckerman | Feb. 25, 1930 |
| 2,169,521 | Chong | Aug. 15, 1939 |
| 2,314,681 | Beatty | Mar. 23, 1943 |
| 2,430,665 | Briggs | Nov. 11, 1947 |
| 2,433,799 | Walz et al. | Dec. 30, 1947 |
| 2,543,529 | Kroll | Feb. 27, 1951 |